US010012217B2

(12) United States Patent
Heverly, II et al.

(10) Patent No.: US 10,012,217 B2
(45) Date of Patent: Jul. 3, 2018

(54) CONTROLLED PUMP AUGMENTATION FOR ACTIVE VIBRATION ISOLATION

(71) Applicant: Bell Helicopter Textron Inc., Fort Worth, TX (US)

(72) Inventors: David E. Heverly, II, Arlington, TX (US); Taeoh Lee, Keller, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 420 days.

(21) Appl. No.: 14/717,516

(22) Filed: May 20, 2015

(65) Prior Publication Data

US 2016/0341226 A1    Nov. 24, 2016

(51) Int. Cl.
| *F16F 9/512* | (2006.01) |
| *F16F 15/02* | (2006.01) |
| *F04B 1/00*  | (2006.01) |
| *F04B 11/00* | (2006.01) |
| *F04B 53/00* | (2006.01) |
| *F16F 9/00*  | (2006.01) |

(52) U.S. Cl.
CPC ............ *F04B 1/00* (2013.01); *F04B 11/00* (2013.01); *F04B 11/005* (2013.01); *F04B 53/001* (2013.01); *F16F 9/00* (2013.01)

(58) Field of Classification Search
CPC .......... F04B 1/02; F04B 1/0435; F04B 15/02; F04B 17/02; F04B 19/22; F04B 11/005; F16F 9/53; B64C 2027/004; B64C 11/008
USPC .............. 91/165, 167 R, 177, 181, 183, 188; 60/469, 468
See application file for complete search history.

(56) References Cited

U.S. PATENT DOCUMENTS

| 496,689 | A | * | 5/1893 | Knudsen | F01B 17/04 91/160 |
| 655,775 | A | * | 8/1900 | Gollings | F01B 17/04 123/51 A |
| 3,118,381 | A | * | 1/1964 | Keil | F04B 1/0435 417/214 |
| 4,659,483 | A | * | 4/1987 | Gries | B01D 25/007 210/224 |
| 5,067,684 | A | * | 11/1991 | Garnjost | F16F 15/027 248/550 |

(Continued)

FOREIGN PATENT DOCUMENTS

WO    2013/011264    1/2013

*Primary Examiner* — Thomas E Lazo
*Assistant Examiner* — Dustin T Nguyen

(57) ABSTRACT

A vibration isolation system includes a vibration isolator configured to flow a fluid. A fluid pumping system is connected to the vibration isolator. The fluid pumping system includes a fluid flow pathway configured to flow the fluid to the vibration isolator. The fluid pumping system includes a piston assembly positioned in the fluid flow pathway. The piston assembly includes a first piston and a second piston configured to displace the fluid in opposite directions through the fluid flow pathway. The vibration isolation system includes a fluid flow augmentation system, which includes an eccentric member positioned between the first piston and the second piston. The fluid flow augmentation system is configured to control a flow of the fluid to the vibration isolator through the fluid flow pathway by controlling a displacement of the first piston and the second piston through at least a partial rotation of the eccentric member.

17 Claims, 8 Drawing Sheets

(56) References Cited

U.S. PATENT DOCUMENTS

| | | | | |
|---|---|---|---|---|
| 5,332,203 A * | 7/1994 | Gossman | ............... | F16F 15/027 248/550 |
| 8,731,743 B2 * | 5/2014 | Seifert | .................. | B64C 27/001 188/316 |
| 2011/0303049 A1 * | 12/2011 | Neelakantan | ....... | F16H 61/0021 74/733.1 |
| 2011/0316207 A1 * | 12/2011 | Smith | .................... | B64C 27/001 267/140.15 |
| 2013/0119591 A1 * | 5/2013 | Lee | ......................... | F16F 13/24 267/140.14 |
| 2014/0263825 A1 * | 9/2014 | Heverly, II | ......... | F16F 15/0275 244/60 |
| 2015/0047404 A1 * | 2/2015 | De Luca | ............... | F15B 21/008 72/245 |
| 2015/0060595 A1 * | 3/2015 | Plummer | .............. | B64C 27/001 244/17.11 |

* cited by examiner

CONTROLLED PUMP AUGMENTATION FOR ACTIVE VIBRATION ISOLATION

TECHNICAL FIELD

This disclosure relates to vibration isolation systems, for example, rotorcraft vibration isolation systems.

BACKGROUND

Different rotorcraft bodies experience different levels of vibration. For example, a rotor system of a rotorcraft experiences periodic vibration due to the rotation of a rotor, while a fuselage of the rotorcraft experiences a vibration that is different from that experienced by the rotor system. A vibration isolation system is used in rotorcrafts such as helicopters and tiltrotor aircrafts to reduce or suppress vibration transmission between two bodies of a rotorcraft, for example, between the rotor system and the fuselage. A vibration isolation system sometimes includes one or more liquid inertia vibration eliminator (LIVE™) units connecting two bodies of a rotorcraft to reduce or cancel transmissibility of vibration between the two bodies. Sometimes, LIVE™ units can be characterized as passive LIVE™ units or active LIVE™ units.

SUMMARY

This disclosure describes isolating vibrations between vibrating bodies. For example, this disclosure describes controlled pump augmentation for active vibration isolation.

Certain aspects of the subject matter described here can be implemented as a vibration isolation system. The system includes a vibration isolator configured to flow a fluid. A fluid pumping system is connected to the vibration isolator. The fluid pumping system includes a fluid flow pathway configured to flow the fluid to the vibration isolator. The fluid pumping system includes a piston assembly positioned in the fluid flow pathway. The piston assembly includes a first piston and a second piston configured to displace the fluid in opposite directions through the fluid flow pathway. The vibration isolation system includes a fluid flow augmentation system, which includes an eccentric member positioned between the first piston and the second piston. The fluid flow augmentation system is configured to control a flow of the fluid to the vibration isolator through the fluid flow pathway by controlling a displacement of the first piston and the second piston through at least a partial rotation of the eccentric member.

This, and other aspects, can include one or more of the following features. The fluid flow augmentation system can include a motor connected to the eccentric member. The motor can be configured to control the rotation of the eccentric member. The fluid flow augmentation system can include a clutch connected to the motor and the eccentric member. The clutch can be configured to transmit at least a partial rotation of the motor to the eccentric member. The motor can be a first motor configured to at least partially rotate the first eccentric member in a first direction. The fluid flow augmentation system can further include a second motor connected to the eccentric member and configured to control the rotation of the eccentric member in a direction opposite the first direction. The clutch can be a first clutch. The fluid flow augmentation system can include a second clutch connected to the second motor and the eccentric member. The second clutch can be configured to transmit at least a partial rotation of the second motor in the direction opposite the first direction to the eccentric member. A controller can be connected to the first clutch, the first motor, the second clutch and the second motor. The controller can be configured to control the first clutch, the first motor, the second clutch and the second motor to control a transmission of rotation of the first motor and the second motor to the eccentric member. At least one vibration sensor can be connected to the vibration isolator and the controller. The controller can be configured to control the first clutch, the first motor, the second clutch and the second motor based, in part, on vibration sensed by the vibration sensor. The fluid flow augmentation system can include a fluid bypass pathway connected in parallel with the fluid flow pathway and the vibration isolator. The fluid bypass pathway can flow at least a portion of the fluid. The fluid flow augmentation system can include a fluid flow regulation valve connecting the fluid bypass pathway and the vibration isolator. The fluid flow augmentation system can be configured to control the fluid flow regulation valve to regulate a quantity of fluid flowed to the fluid bypass pathway and the vibration isolator. A controller can be connected to the fluid flow regulation valve. The controller can be configured to control the fluid flow regulation valve to regulate the quantity of fluid flowed to the fluid bypass pathway and the vibration isolator. At least one vibration sensor can be connected to the vibration isolator and the controller. The controller can be configured to control the fluid flow regulation valve based, in part, on vibration sensed by the vibration sensor. The fluid flow pathway can be a first fluid flow pathway. The piston assembly can be a first piston assembly. The eccentric member can be a first eccentric member. The flow augmentation system can include a second fluid flow pathway, a second piston assembly and a second eccentric member. The second fluid flow pathway can be configured to flow the fluid to the vibration isolator. The second fluid flow pathway can be connected to the vibration isolator and the first fluid flow pathway. The second piston assembly can be positioned in the second fluid flow pathway. The second piston assembly can include a third piston and a fourth piston configured to displace the fluid in opposite directions through the second fluid flow pathway. The second eccentric member can be positioned between the third piston and the fourth piston. The fluid flow augmentation system can be configured to control a displacement of the third piston and the fourth piston through at least a partial rotation of the second eccentric member. The fluid flow augmentation system can include a motor connected to the second eccentric member. The motor can be configured to control the rotation of the second eccentric member. A controller can be connected to the first motor and the second motor. The controller can be configured to control a rotational phase relationship between the first eccentric member and the second eccentric member. At least one vibration sensor can be connected to the vibration isolator and the controller. The controller can be configured to control the rotational phase relationship between the first eccentric member and the second eccentric member based, in part, on vibration sensed by the vibration sensor.

Certain aspects of the subject matter described here can be implemented as a method of controlling a vibration isolator. A piston assembly is positioned in a fluid flow pathway connected to the vibration isolator. The piston assembly includes a first piston and a second piston configured to displace fluid in opposite directions through the fluid flow pathway to the vibration isolator. An eccentric member is positioned between the first piston and the second piston. A flow of the fluid to the vibration isolator through the fluid flow pathway is controlled by controlling a displacement of the first piston and the second piston by at least partially rotating the eccentric member.

This, and other aspects, can include one or more of the following features. To control the flow of the fluid to the vibration isolator through the fluid flow pathway, the eccentric member can be at least partially rotated in opposite directions using a first motor and a second motor connected to the eccentric member. The first motor and the second motor are configured to rotate the eccentric member in opposite directions. To at least partially rotate the eccentric member in opposite directions using the first motor and the second motor, a first clutch can be connected to the first motor and the eccentric member, a second clutch can be connected to the second motor and the eccentric member, and a transmission of a rotation of the first motor and a transmission of a rotation of the second motor to the eccentric member can be controlled. To control the flow of the fluid to the vibration isolator through the fluid flow pathway can include, a fluid bypass pathway can be positioned in parallel with the fluid flow pathway and the vibration isolator. The fluid bypass pathway can flow at least a portion of the fluid. A fluid flow regulation valve can be connected to the fluid bypass pathway and the vibration isolator. The fluid flow regulation valve can be controlled to regulate a quantity of fluid flowed to the fluid bypass pathway and the vibration isolator. The fluid flow pathway can be a first fluid flow pathway. The eccentric member can be a first eccentric member. To control the flow of the fluid to the vibration isolator through the fluid flow pathway, a second fluid flow pathway can be connected to the vibration isolator and the first fluid flow pathway. The second fluid flow pathway can be configured to flow the fluid to the vibration isolator. A second piston assembly can be positioned in the second fluid flow pathway. The second piston assembly can include a third piston and a fourth piston configured to displace the fluid in opposite directions through the second fluid flow pathway. A second eccentric member can be positioned between the third piston and the fourth piston. A displacement of the third piston and the fourth piston can be controlled through at least a partial rotation of the second eccentric member. To control a flow of the fluid to the vibration isolator through the fluid flow pathway, a vibration signal representing a vibration of the vibration isolator can be received from a vibration sensor. A rotation of the eccentric member can be modified based, in part, on the received vibration signal to control the displacement of the first piston and the second piston.

The details of one or more embodiments of the subject matter described in this disclosure are set forth in the accompanying drawings and the description below. Other features, aspects, and advantages of the subject matter will become apparent from the description, the drawings, and the claims.

DETAILED DESCRIPTION

This disclosure describes isolating vibrations between vibrating bodies, for example, by controlled pump augmentation during active vibration isolation. A vibration isolation system includes a vibration isolator (for example, LIVE™ unit) and a fluid regulator (for example, pumping device or regulator or both) to controllably alter fluid flow through the vibration isolator. A vibration isolation system attenuates, isolates, or otherwise reduces transfer of vibration (for example, periodic vibration) between two or more bodies. Vibration isolation systems can be implemented in aircraft such as helicopters, tiltrotors and rotorcrafts to isolate a fuselage or other portions of an aircraft from mechanical vibrations (for example, harmonic vibrations) associated with propulsion system components (for example, rotors, engine, transmission, propellers, gearbox, and/or other). For example, rotorcraft vibrations of concern include a blade passage frequency and higher harmonics, among others.

Figure 1:
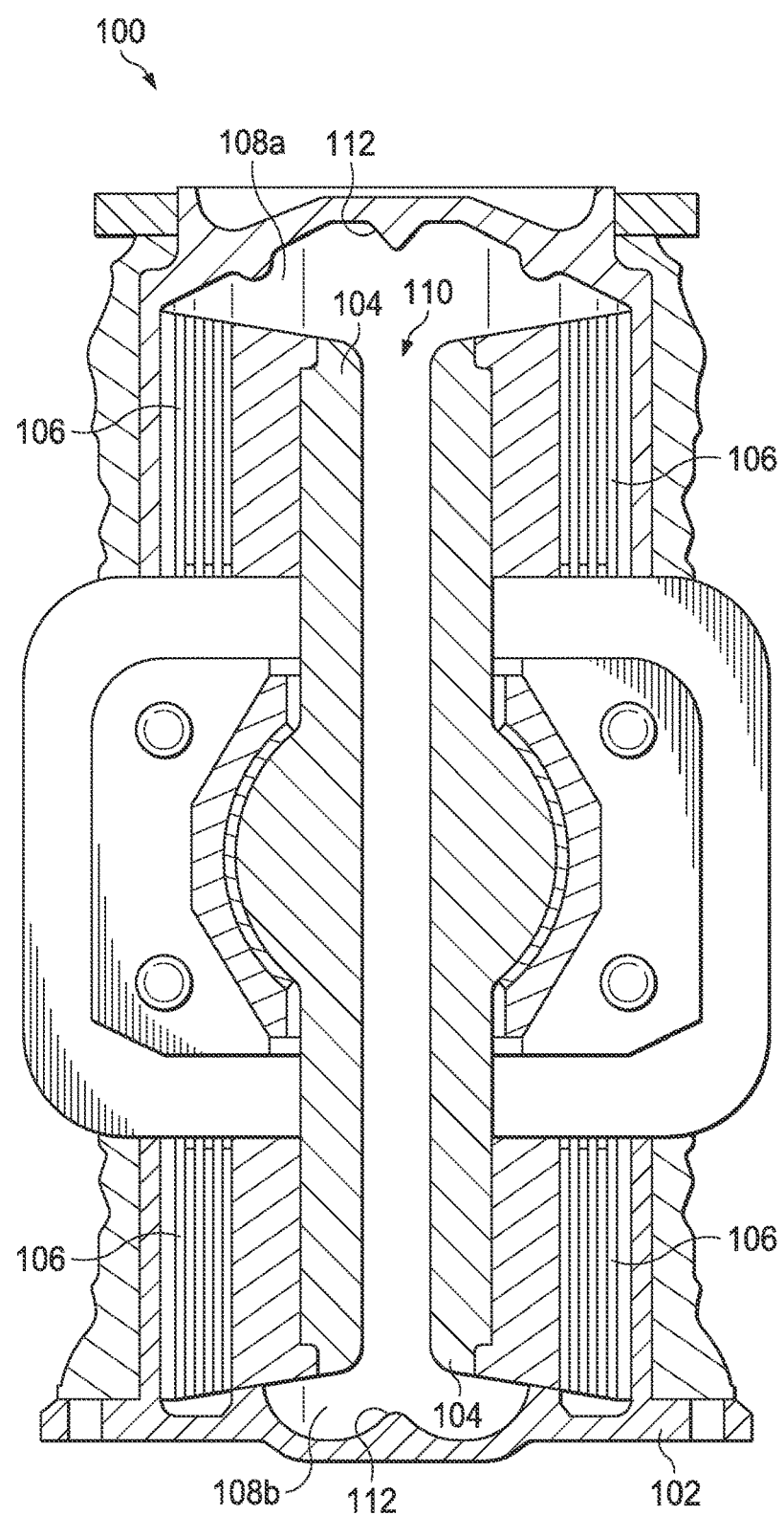
FIG. 1 is a cross-sectional side view of an example LIVE™ unit

FIG. 1 is a cross-sectional side view of an example LIVE™ unit. In some implementations, an example vibration isolator includes a LIVE™ unit connecting two moving bodies (for example, vibratory bodies and/or surfaces). LIVE™ units are vibration-cancelling throughput components and can take many forms. The example LIVE™ unit 100 can be used in vibration isolation systems such as those described above and with reference to the figures above. The example LIVE™ unit 100 includes a housing 102 that has a hollow, generally cylindrical interior. A piston 104 of a selected cross-sectional diameter is disposed within the interior of the housing 102. An elastomeric seal and spring member 106 resiliently seals the piston 104 within the interior of the housing 102. A first fluid chamber 108a and a second fluid chamber 108b are defined by the interior of the housing 102 and the piston 104 and are sealed against leakage by the elastomeric seal and spring member 106. Tuning fluid (for example, high-density, low-viscosity fluid) is disposed within the fluid chambers 108a and 108b. In addition to sealing the tuning fluid in fluid chambers 108a and 108b, the elastomeric seal and spring member 106 functions as a spring to permit the piston 104 to move or oscillate (for example, longitudinally move or oscillate) relative to the housing 102, while maintaining the piston 104 in a central location in the housing 102 when no load is applied. A tuning port 110 extends centrally through the piston 104 and permits the tuning fluid to flow between the first fluid chamber 108a and the second fluid chamber 108b (i.e., from the first fluid chamber 108a to the second fluid chamber 108b, and vice versa).

In some instances, a rotorcraft operates at a constant rotor speed, so the corresponding blade passage frequency is substantially constant. In such instances, passive vibration isolators provide good vibration isolation (for example, approximately 85%-95%) at one design frequency (for example, Nb/rev). In general, passive vibration isolators are, by design, effective at a constant vibration frequency that coincides with the designed isolation (tuning) frequency. However, in certain instances, a rotorcraft operates at varying (i.e., not constant) rotor speeds, so the corresponding blade passage frequency is not constant. In such instances (for example, for rotorcraft operating with multiple rotor speed), the performance of the passive vibration isolation unit is compromised because the unit is tuned at a single frequency.

An active vibration isolation system can be effective over a range of frequencies to accommodate more than just a specific isolation frequency. In other words, the dynamic response characteristics of an active vibration isolation system can be altered as desired. Active vibration isolation includes active adjustment of the isolation frequency and the frequency response characteristics of a vibration isolation system. For example, a pressure differential in the LIVE™ unit can be actively adjusted to affect the isolation frequency and frequency response characteristics of a vibration isolation system.

Active pumper concepts were introduced to augment the LIVE™ technology and improve vibration isolation for aircraft, for example, helicopters and tiltrotors, operating with variable RPM. The pumper unit provides additional actuation power to achieve good vibration isolation performance. The performance, moreover, is insensitive to changes in the main rotor RPM. The pumper unit can be actuated by piezoelectric actuation or electromagnetic actuation. Such active pumper devices offer additional LIVE™ tuning fluid oscillation by mechanically activating the piston of a pumper unit.

Piezoelectricity actuated pumper devices typically produce small displacements and require large-sized pistons and heavy pumping devices to deliver required power. Electromagnetic actuated pumper devices, while not displacement limited, can have limited force output. Such pumper devices may also be large and heavy to produce required power. In addition, an electromagnetic pump device, which uses an electric motor to oscillate a piston and dynamically displace the tuning fluid, is commanded to generate a harmonic (for example, sinusoidal) displacement output. The electric motor speed and sinusoidal displacement amplitude are controlled to produce the desired quantity of pumped fluid and the frequency of fluid oscillations. To produce the sinusoidal displacement output, the electric motor has to constantly reverse directions in a periodic fashion, which results in very large accelerations. Thus, the electric motor must generate large forces or torque to overcome the inertia of the motor and piston assembly. Additionally, the motor must overcome the forces associated with the differential fluid pressure across the pumper piston.

This application describes an electro-mechanical harmonic pump device to actively augment a vibration isolator. In some implementations, the device can include a combination of one or more motors (for example, motors driven by electricity or other sources of energy), one or more mechanisms to convert rotational motion to translational motion, one or more piston assemblies to displace fluids, and valves to regulate fluid flow.

The system described in this disclosure can be implemented as an efficient, light weight, and small pumper design for augmenting LIVE™ technology and creating an active vibration isolation system. The system described incorporates one or more electric motors, each of which rotates in one direction at a constant speed, and whose directions need not be periodically reversed. The system described here does not have to overcome large inertia forces associated with motor direction reversals and the corresponding accelerations. Because the motor always rotates in the same direction, the inherent rotational inertia of the motor becomes advantageous to assist with overcoming the forces associated with piston inertia and fluid pressure oscillations. The piston assembly of the system described here is continuously displacing a constant quantity of fluid in each cycle of piston oscillation. The fluid displaced by the pump is either directed towards the LIVE™ unit or is directed to an alternative fluid pathway that bypasses the LIVE™. The quantity of fluid directed towards the LIVE™ unit can be regulated by controlling the proportion that flows in the alternative fluid pathway. The system is commanded by a controller, and the pump provides a regulated amount of additional tuning fluid oscillation into the upper and lower fluid chambers of the LIVE™ unit. The electrical power required to operate the system described here can be less than the power required to operate conventional electromagnetic pumping devices. The weight of an active vibration isolation system and the power required to operate the active vibration isolation system can be minimized by implementing the system described here.

Figure 2A:
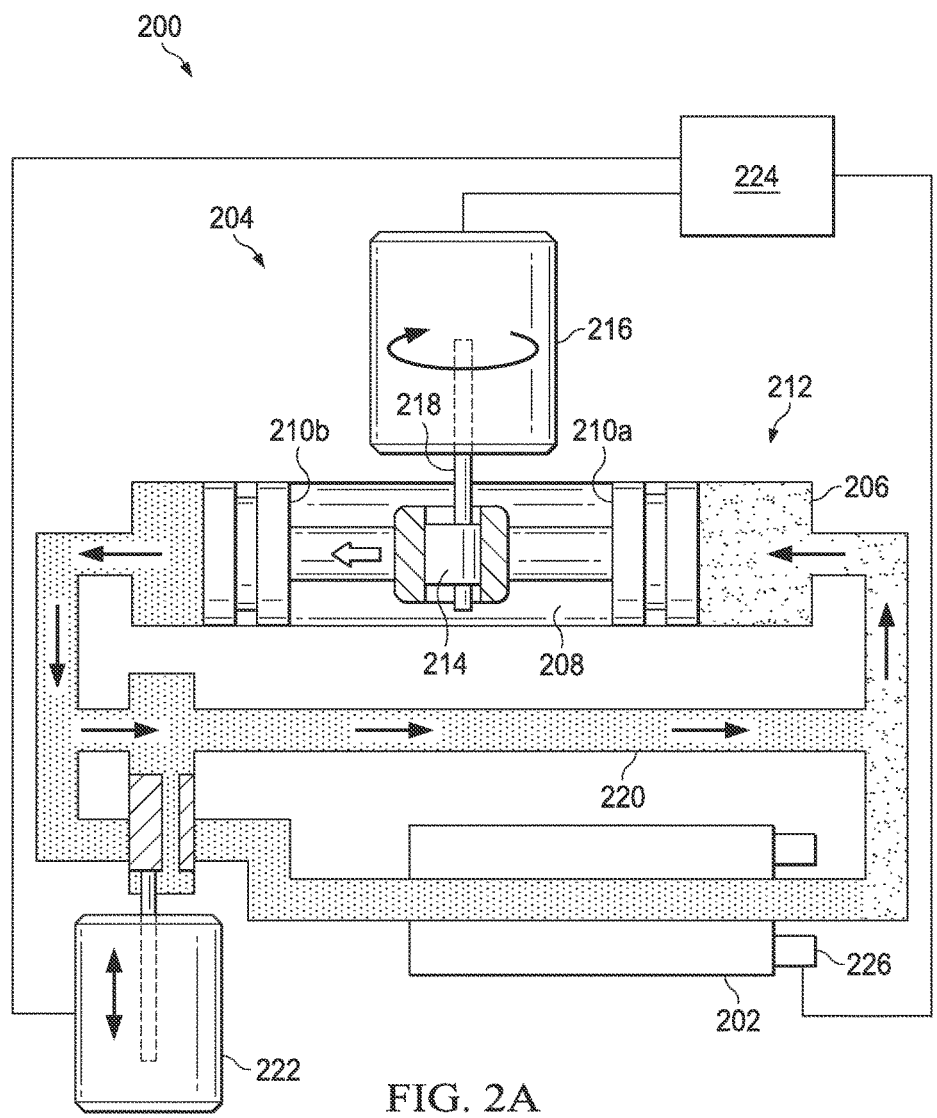
FIGS. 2A and 2B are schematic diagrams of a first implementation of an augmented active vibration isolation system.
Figure 2B:
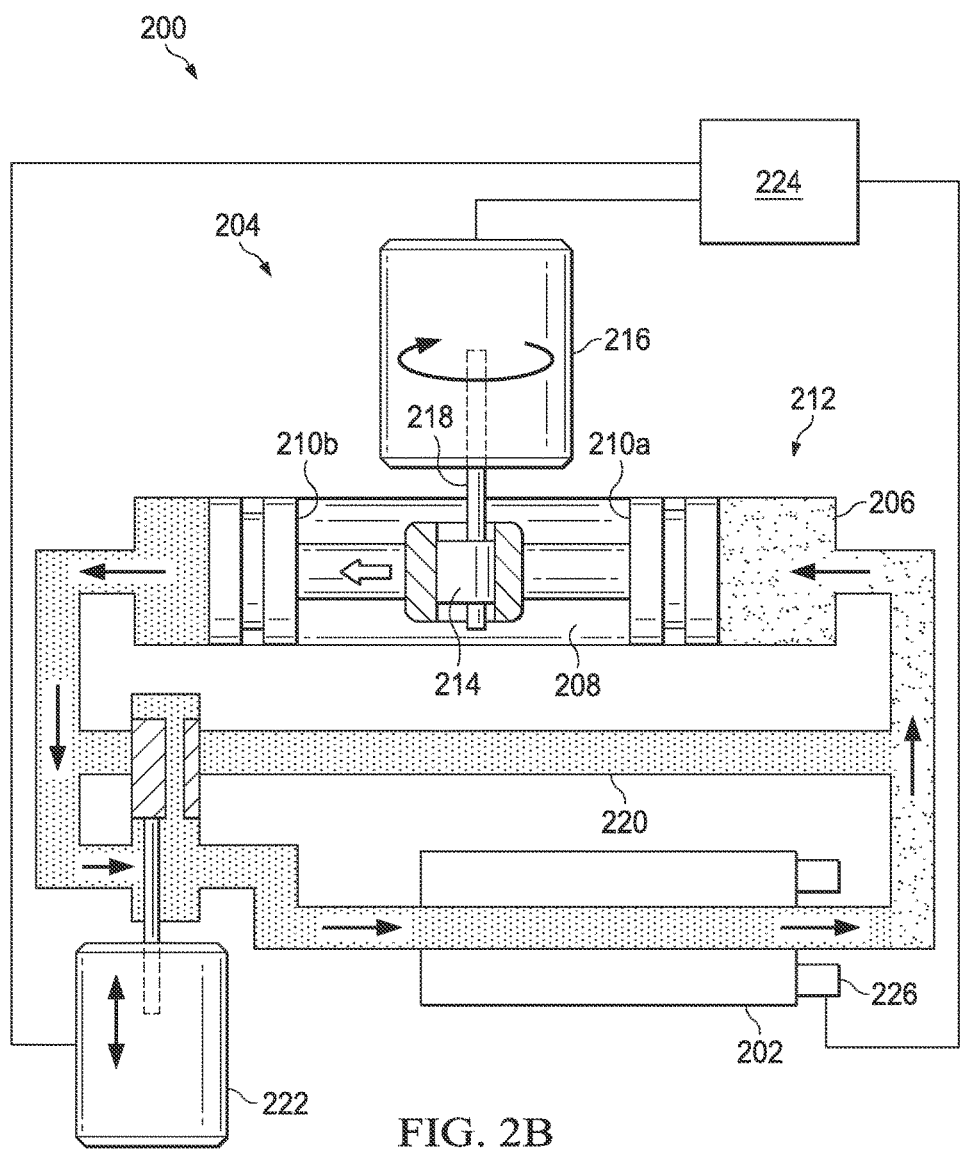

FIGS. 2A and 2B are schematic diagrams of a first implementation of an augmented active vibration isolation system 200. The system 200 includes a vibration isolator 202 configured to flow a fluid. In some implementations, the vibration isolator 202 is a LIVE™ unit such as the one described above with reference to FIG. 1. The system 200 includes a fluid pumping system 204 connected to the vibration isolator 202. The fluid pumping system 204 includes a fluid flow pathway 206 configured to flow the fluid to the vibration isolator 202. A piston assembly 208 is positioned in the fluid flow pathway 206. The piston assembly 208 includes a first piston 210a and a second piston 210b configured to displace the fluid in opposite directions through the fluid flow pathway 206.

The system 200 includes a fluid flow augmentation system 212. The augmentation system 212 includes an eccentric member 214 positioned between the first piston 210a and the second piston 210b. In some implementations, the eccentric member 214 can be configured to convert rotational motion to translational motion, for example, a sinusoidal translational motion. For example, the eccentric member 214 can be a slider crank, a cam follower, a scotch yoke, or other member having a non-circular surface that can convert rotational motion to translational motion. The augmentation system 212 is configured to control a flow of the fluid to and from the vibration isolator 202 through the fluid flow pathway 206 by controlling a displacement of the first piston 210a and the second piston 210b through at least a partial rotation of the eccentric member 214.

In some implementations, the augmentation system 212 includes a motor 216 connected to the eccentric member 214. For example, the motor 216 (for example, an electric motor, a pneumatic motor, a hydraulic motor, or other motor) can rotate a shaft 218 to which the eccentric member 114 is connected. The motor 216 is configured to control the rotation of the eccentric member 214 by rotating the shaft 218.

In some implementations, the augmentation system 212 can include a fluid bypass pathway 220 connected in parallel with the fluid flow pathway 206 and the vibration isolator 202. The fluid bypass pathway 220 is configured to flow at least a portion of the fluid. The augmentation system 212 can include a fluid flow regulation valve 222 connecting the fluid bypass pathway 220 and the vibration isolator 202. The augmentation system 212 is configured to control the fluid flow regulation valve 222 to regulate a quantity of fluid flowed to the fluid bypass pathway 220 and a quantity of fluid flowed to the vibration isolator 202.

The system 200 can include a controller 224 connected to the fluid flow regulation valve 222. The controller 224 is configured to control the fluid flow regulation valve 222 to regulate the quantity of fluid flowed to the fluid bypass pathway 220 and the vibration isolator 202. The controller 224 can be implemented as software, firmware, hardware, a computer-readable medium storing instructions executable by one or more processors, processing circuitry, or combinations of them. In some implementations, the system 200 can include at least one sensor 226 connected to the vibration isolator 202 and the controller 224. For example, the at least one sensor 226 can be a vibration sensor that can sense a vibration of the vibration isolator 202 and output a signal that represents the sensed vibration to the controller 224. The controller 224 is configured to control the fluid flow regulation valve 222 based, in part, on the vibration sensed by the sensor 226.

In operation, the controller 224 controls the motor 216 to rotate the shaft 218. Continuous rotation of the eccentric member 214 creates an oscillatory harmonic motion causing displacement of the first piston 210a and the second piston 210b in opposing directions in the fluid flow pathway 206, which, in turn, results in oscillatory fluid flow.

The controller 224 further controls the fluid flow regulation valve 222 to control the flow of the fluid through either the fluid bypass pathway 220 or the vibration isolator 202. For example, FIG. 2A shows the fluid flow regulation valve 222 closing the flow pathway to the vibration isolator 202, thereby causing more fluid to flow through the fluid bypass pathway 220. FIG. 2B shows the fluid flow regulation valve 222 closing the fluid bypass pathway 220, thereby causing more fluid to flow through the vibration isolator 202. To flow all the fluid through the fluid bypass pathway 220, the controller 224 can control the fluid flow regulation valve 222 to entirely shut off the flow pathway to the vibration isolator 202 and leave entirely open the fluid bypass pathway 220. To flow all the fluid through the vibration isolator 202, the controller 224 can control the fluid flow regulation valve 222 to entirely shut off the fluid bypass pathway 220 and leave entirely open the flow pathway to the vibration isolator 202. The controller 224 can vary amounts by which the fluid bypass pathway 220 or the flow pathway to the vibration isolator 202 is opened or closed by controlling positions of the fluid flow regulation valve 222. In this manner, the controller 224 can control a quantity of fluid flowing through the vibration isolator 202.

Figure 3A:
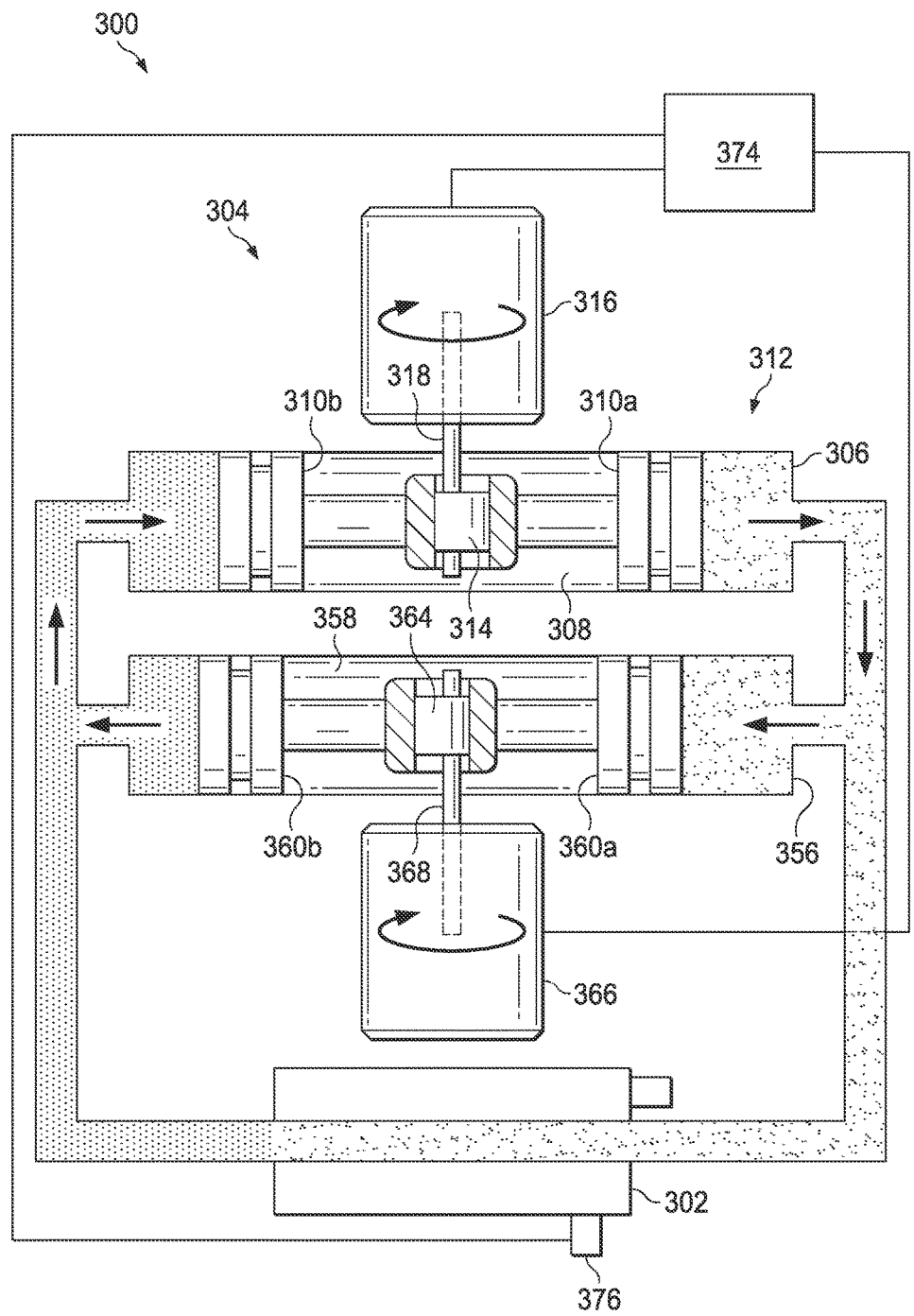
FIGS. 3A and 3B are schematic diagrams of a second implementation of an augmented active vibration isolation system.
Figure 3B:
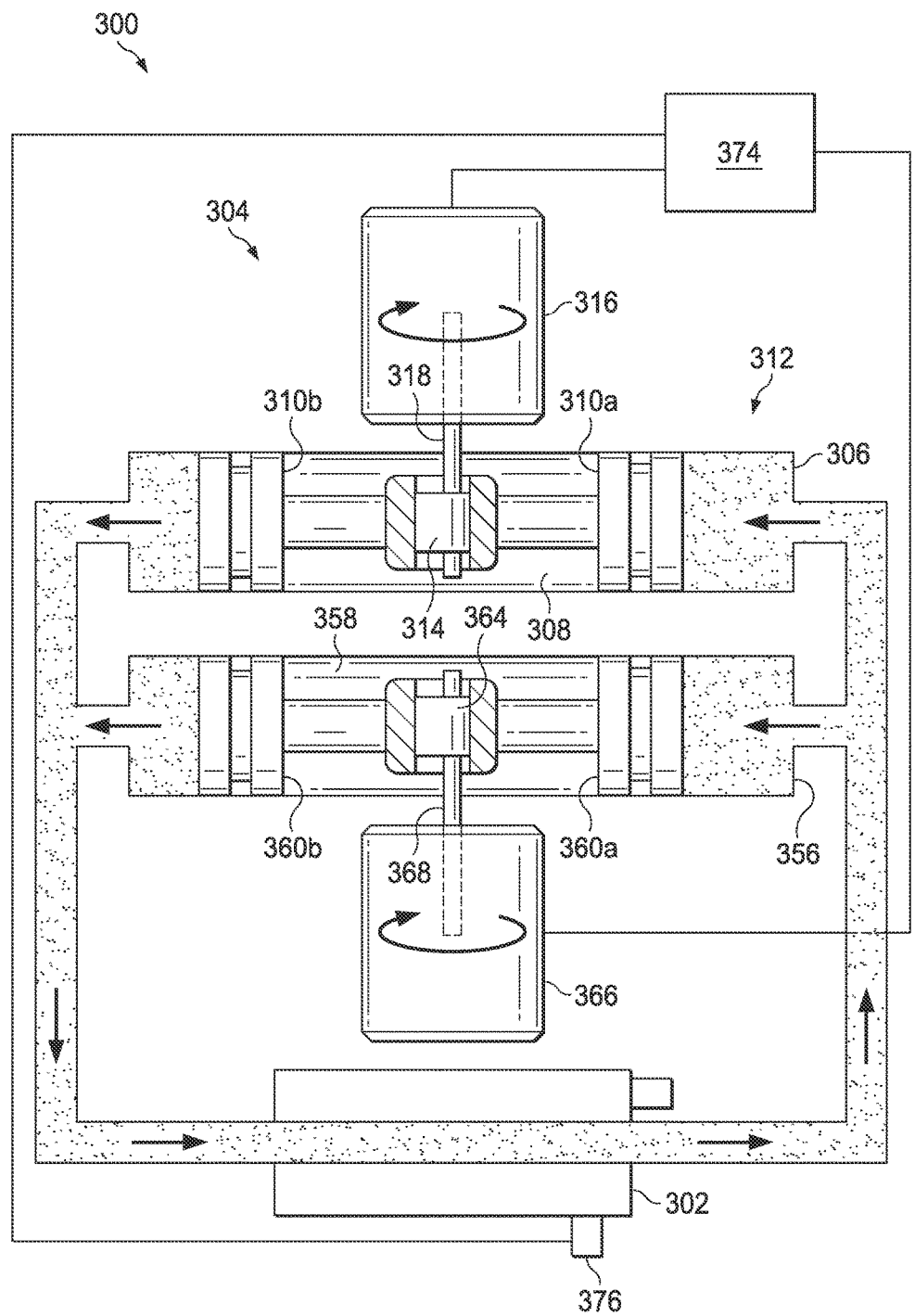

FIGS. 3A and 3B are schematic diagrams of a second implementation of an augmented active vibration isolation system 300. The system 300 includes a vibration isolator 302 configured to flow a fluid. In some implementations, the vibration isolator 302 is a LIVE™ unit such as the one described above with reference to FIG. 1. The system 300 includes a fluid pumping system 304 connected to the vibration isolator 302. The fluid pumping system 304 includes a first fluid flow pathway 306 configured to flow the fluid to the vibration isolator 302. A first piston assembly 308 is positioned in the first fluid flow pathway 306. The piston assembly 308 includes a first piston 310a and a second piston 310b configured to displace the fluid in opposite directions through the first fluid flow pathway 306.

The system 300 includes a fluid flow augmentation system 312. The augmentation system 312 includes a first eccentric member 314 positioned between the first piston 310a and the second piston 310b. In some implementations, the first eccentric member 314 can be configured to convert rotational motion to translational motion. For example, the first eccentric member 314 can be a slider crank, a cam follower, a scotch yoke, or other member having a non-circular surface that can convert rotational motion to translational motion. The augmentation system 312 is configured to control a flow of the fluid to the vibration isolator 302 through the first fluid flow pathway 306 by controlling a displacement of the first piston 310a and the second piston 310b through at least a partial rotation of the first eccentric member 314.

In some implementations, the augmentation system 312 includes a first motor 316 connected to the first eccentric member 314. For example, the first motor 316 (for example, an electric motor, a pneumatic motor, a hydraulic motor, or other motor) can rotate a first shaft 318 to which the first eccentric member 314 is connected. The first motor 316 is configured to control the rotation of the first eccentric member 314 by rotating the first shaft 318.

In some implementations, the augmentation system 312 includes a second fluid flow pathway 356 configured to flow the fluid to the vibration isolator 302. For example, each of the first fluid flow pathway 306, the second fluid flow pathway 356, and the vibration isolator 302 is fluidically connected in parallel. Therefore, the first fluid flow pathway 306 and the second fluid flow pathway 256 share a common fluid port, and these fluid ports are connected to the upper and lower fluid ports of the vibration isolator 302. A second piston assembly 358 is positioned in the second fluid flow pathway 356. The piston assembly 358 includes a third piston 360a and a fourth piston 360b configured to displace the fluid in opposite directions through the second fluid flow pathway 356.

The augmentation system 312 includes a second eccentric member 364 positioned between the third piston 360a and the fourth piston 360b. In some implementations, the second eccentric member 364 can be configured to convert rotational motion to translational motion, for example, a sinusoidal translational motion. For example, the second eccentric member 364 can be a slider crank, a cam follower, a scotch yoke, or other member having a non-circular surface that can convert rotational motion to translational motion. The augmentation system 312 is configured to control a flow of the fluid to the vibration isolator 302 through the second fluid flow pathway 356 by controlling a displacement of the third piston 360a and the fourth piston 360b through at least a partial rotation of the second eccentric member 364.

In some implementations, the augmentation system 212 includes a second motor 366 connected to the second eccentric member 364. For example, the second motor 356 (for example, an electric motor, a pneumatic motor, a hydraulic motor, or other motor) can also be connected to and rotate a second shaft 368 to which the second eccentric member 364 is connected. The second motor 366 is configured to control the rotation of the second eccentric member 364 by rotating the second shaft 368. As shown in FIG. 3B, the first motor 316 and the second motor 366 can be configured to rotate the first shaft 318 and the second shaft 368 independently of each other. Because the first shaft 318 and the second shaft 368 are not axially connected, a rotation of one shaft does not affect a rotation of the other. As described below, a quantity of fluid flowed through the vibration isolator 302 can be controlled by controlling a rotational phase relationship between the first eccentric member 314 and the second eccentric member 364 using the first motor 316 and the second motor 366, respectively.

The system 300 can include a controller 374 connected to the first motor 316 and the second motor 366. The controller 374 is configured to control the rotational phase relationship between the first eccentric member 314 and the second eccentric member 364. The controller 374 can be implemented as software, firmware, hardware, a computer-readable medium storing instructions executable by one or more processors, processing circuitry, or combinations of them. In some implementations, the system 300 can include at least one sensor 376 connected to the vibration isolator 302 and the controller 374. For example, the at least one sensor 376 can be a vibration sensor that can sense a vibration of the vibration isolator 302 and output a signal that represents the sensed vibration to the controller 374. The controller 374 can determine a rotational phase relationship at which the first eccentric member 314 and the second eccentric member 364 are to be rotated to control a fluid output by the first piston assembly 208 and the second piston assembly 358, respectively. The controller 374 is configured to transmit instructions to the first motor 316 and the second motor 366 to rotate the first shaft 318 and the second shaft 368 according to the determined rotational phase relationship.

In operation, the controller 374 controls the first motor 316 and the second motor 366 to rotate the first shaft 318 and the second shaft 368, respectively. Continuous rotation of each eccentric member by the respective motor creates an oscillatory harmonic motion causing displacement of the pairs of pistons in opposing directions in the respective fluid flow pathways, which, in turn, results in oscillatory fluid flow in each fluid flow pathway.

As described above, the controller 374 is configured to determine a rotational phase relationship between the first eccentric member 314 and the second eccentric member 364. The rotational phase relationship describes a rotational relationship between the first shaft 318 and the second shaft 368. In some implementations, the following pairs of elements are substantially similar in construction: the first fluid flow pathway 306 and the second fluid flow pathway 356, the first piston 310a and the third piston 360a, the second piston 310b and the fourth piston 360b, and the first eccentric member 314 and the second eccentric member 364. In addition, the first motor 316 and the second motor 366 are substantially similar in construction and operation. Also, the first eccentric member 314 and the second eccentric member 364 can be aligned along the axes of rotation of the first shaft 318 and the second shaft 368. That is, the eccentricities of the first eccentric member 314 and the second eccentric member 364 can be on the same plane.

In one example operation shown in FIG. 3A, the first motor 316 rotates the first shaft 318 in a clockwise direction and the second motor 366 also rotates the second shaft 368 in a clockwise direction at the same RPM. In response, the oscillatory fluid flow results in the first fluid flow pathway 306 and the second fluid flow pathway 356. In this example operation, the pistons in the first fluid flow pathway 306 are completely out of phase with the pistons in the second fluid flow pathway 306. Consequently, no fluid flows through the vibration isolator 302. In general, both motors can rotate their respective shafts in the clockwise direction or both motors can rotate their respective shafts in the counter-clockwise direction or one motor can rotate its shaft in a clockwise direction while the other motor can rotate its shaft in a counter-clockwise direction. Because the piston displacements are sinusoidal, the desired phase relationship can be achieved regardless of the direction of motor rotation.

The controller 374 can be configured to control the rotational phase relationship between the first eccentric member 314 and the second eccentric member 364 by controlling the rotational speed of motors 316 and 366. By controlling the rotational phase relationship between the two eccentric members, the controller 374 can regulate a quantity of fluid flow through the vibration isolator 302.

In another example operations shown in FIG. 3B, the first motor 316 rotates the first shaft 318 in a clockwise direction and the second motor 366 also rotates the second shaft 368 in a clockwise direction at the same RPM. In response, the oscillatory fluid flow results in the first fluid flow pathway 306 and the second fluid flow pathway 356. In this example operation, the pistons in the first fluid flow pathway 306 are completely in phase with the pistons in the second fluid flow pathway 356. Consequently, all fluid flows through the vibration isolator 302.

Figure 4:
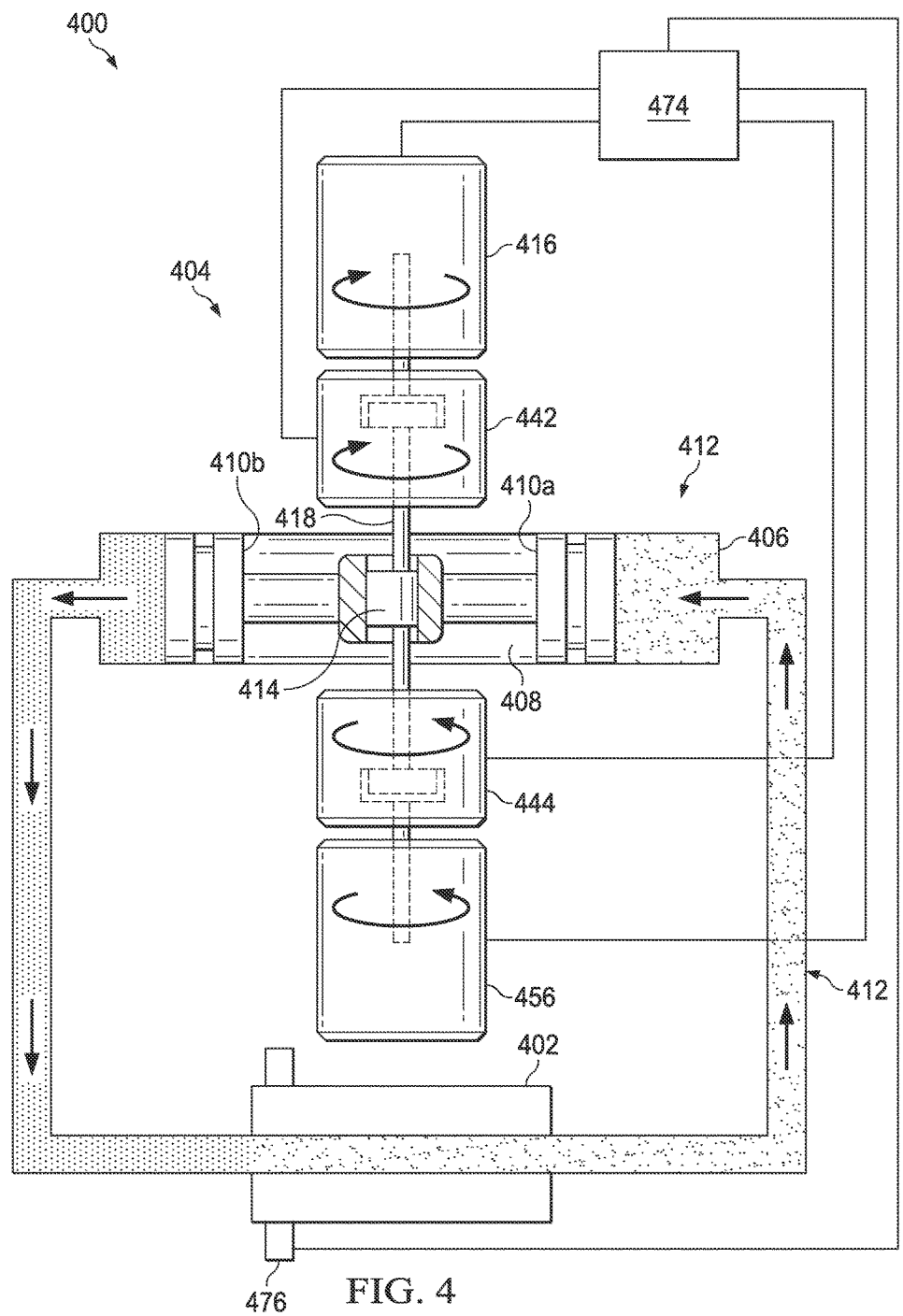
FIG. 4 is a schematic diagram of a third implementation of an augmented active vibration isolation system.

FIG. 4 is a schematic diagram of a third implementation of an augmented active vibration isolation system 400. The system 400 includes a vibration isolator 402 configured to flow a fluid. In some implementations, the vibration isolator 402 is a LIVE™ unit such as the one described above with reference to FIG. 1. The system 400 includes a fluid pumping system 404 connected to the vibration isolator 402. The fluid pumping system 404 includes a fluid flow pathway 406 configured to flow the fluid to the vibration isolator 402. A piston assembly 408 is positioned in the fluid flow pathway 406. The piston assembly 408 includes a first piston 410a and a second piston 410b configured to displace the fluid in opposite directions through the fluid flow pathway 406.

The system 400 includes a fluid flow augmentation system 412. The augmentation system 412 includes an eccentric member 414 positioned between the first piston 410a and the second piston 410b. In some implementations, the eccentric member 414 can be configured to convert rotational motion to translational motion, for example, a sinusoidal translational motion. For example, the eccentric member 414 can be a slider crank, a cam follower, a scotch yoke, or other member having a non-circular surface that can convert rotational motion to translational motion. The augmentation system 412 is configured to control a flow of the fluid to the vibration isolator 402 through the fluid flow pathway 406 by controlling a displacement of the first piston 410a and the second piston 410b through at least a partial rotation of the eccentric member 414.

In some implementations, the augmentation system 412 includes a first motor 416 connected to the eccentric member 414. For example, the first motor 416 (for example, an electric motor, a pneumatic motor, a hydraulic motor, or other motor) can rotate a shaft 418 to which the eccentric member 414 is connected. The first motor 416 is configured to control the rotation of the eccentric member 414 by rotating the shaft 418. The augmentation system 412 includes a first clutch 442 connected to the first motor 416 and the eccentric member 414. The first clutch 442 is positioned between the first motor 416 and the eccentric member 414 and is configured to transmit at least a partial rotation of the first motor 416 to the eccentric member 414.

In some implementations, the augmentation system 412 includes a second motor 456 connected to the eccentric member 414. For example, the second motor 456 (for example, an electric motor, a pneumatic motor, a hydraulic motor, or other motor) can rotate the shaft 418 to which the eccentric member 414 is connected. The second motor 456 is configured to control the rotation of the eccentric member 414 by rotating the shaft 418. As shown in FIG. 4, the first motor 416 and the second motor 456 can be connected to opposing ends of the shaft 418. The augmentation system 412 includes a second clutch 444 connected to the second motor 456 and the eccentric member 414. The second clutch 444 is positioned between the second motor 456 and the eccentric member 414 and is configured to transmit at least a partial rotation of the second motor 456 to the eccentric member 414.

The system 400 can include a controller 474 connected to the first motor 416, the second motor 456, the first clutch 442, and the second clutch 444. The controller 474 is configured to control a transmission of rotation from the first motor 416 to the shaft 418 through the first clutch 442 and a transmission of rotation from the second motor 456 to the shaft 418 through the second clutch 444 to regulate the quantity of fluid flowed to the vibration isolator 402. The controller 474 can be implemented as software, firmware, hardware, a computer-readable medium storing instructions executable by one or more processors, processing circuitry, or combinations of them. In some implementations, the system 400 can include at least one sensor 476 connected to the vibration isolator 402 and the controller 474. For example, the at least one sensor 476 can be a vibration sensor that can sense a vibration of the vibration isolator 402 and output a signal that represents the sensed vibration to the controller 474. The controller 474 is configured to control the transmissions of rotation to the shaft 418 through the two clutches based, in part, on the vibration sensed by the sensor 476.

In operation, the controller 474 controls each of the first motor 416 and the second motor 456 to rotate the shaft 418. The controller 474 also controls the first clutch 442 to transmit at least a portion of the rotation of the first motor 416 to the shaft 418. Similarly, the controller 474 also controls the second clutch 444 to transmit at least a portion of the second motor 456 to the shaft 418. Continuous rotation of the eccentric member 414 creates an oscillatory harmonic motion causing displacement of the first piston 410a and the second piston 410b in opposing directions in the fluid flow pathway 406, which, in turn, results in oscillatory fluid flow. By varying a quantity of the rotation transmitted by each clutch to the respective motor, the controller 474 can vary a quantity of rotation of the shaft 418, thereby regulating a quantity of the fluid flowing to the vibration controller 402. For example, the controller 474 can control each motor to rotate in opposite directions. The controller 474 can engage one of the clutches, for example, clutch 442, to transmit torque from the respective motor to the eccentric member 414, which displaces both pistons in a desired direction. After the pistons are displaced by a previously determined quantity, the controller 474 can disengage the clutch and engage the other clutch. Doing so can transmit torque from the other motor to the eccentric member 414, which displaces nptj pistons in the opposite direction. In this manner, the controller 474 can cause oscillatory harmonic motion of the pairs of pistons by coordinated clutch engagement in an alternating manner. By controlling a timing and coordination of the clutch engagement, the controller 474 can produce desired harmonic pump fluid output through the vibration isolator 402.

Figure 5:
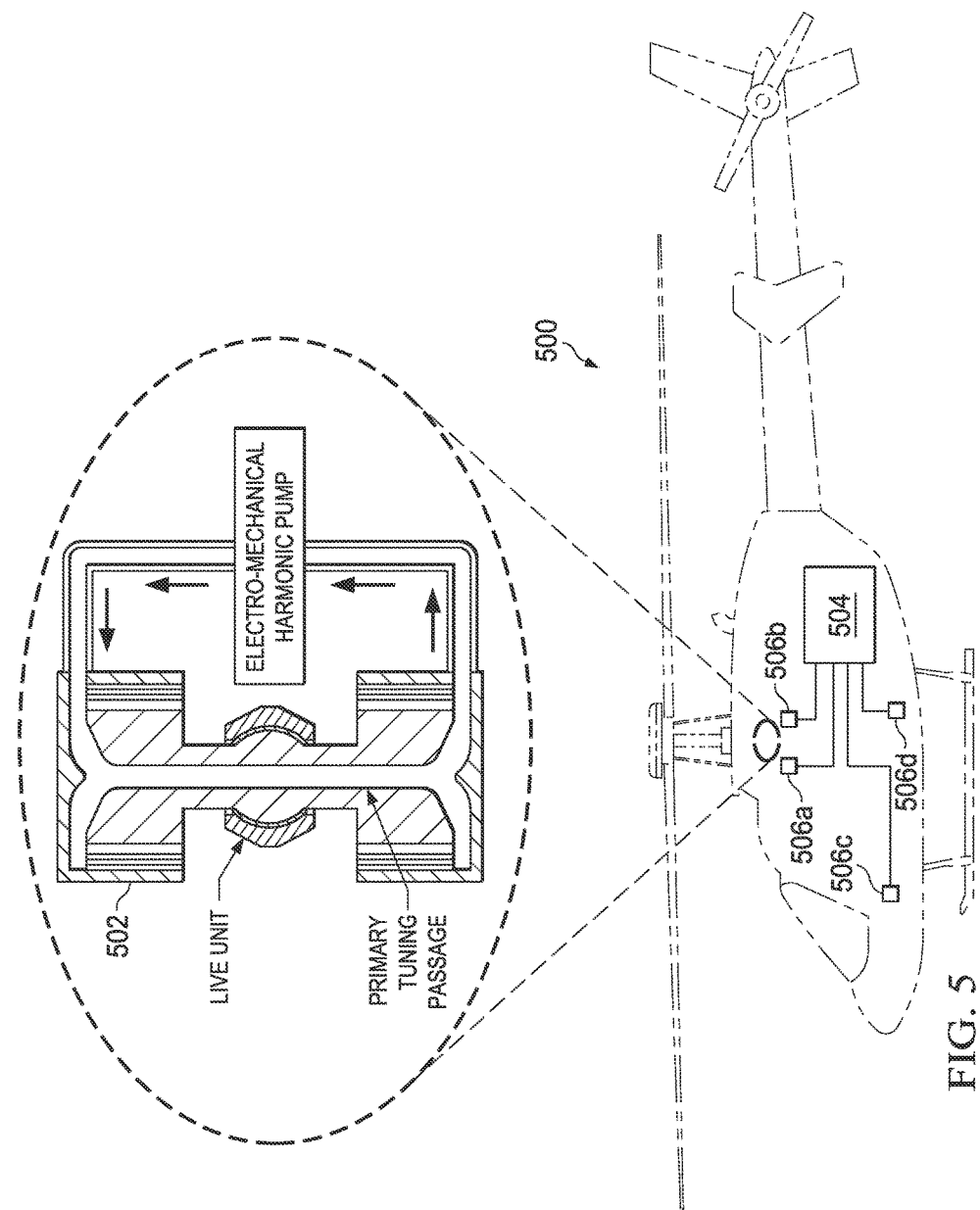
FIG. 5 is a schematic diagram of an active vibration isolation system mounted on an aircraft.

FIG. 5 is a schematic diagram of an active vibration isolation system mounted on an aircraft. In some implementations, the vibration isolation system including the fluid flow augmentation system such as the system described above can be mounted on an aircraft, for example, helicopter 500 or other aircraft. As shown in FIG. 5, the vibration isolation system can include a vibration isolator 502 mounted between the rotor system and fuselage of the helicopter 500. A controller 504 and one or more vibration feedback sensors (for example, a first sensor 506a, 506b, 506c, 506d, and more or fewer sensors) can be attached to different helicopter surfaces or the vibration isolator (or both). The controller 504 can be operated using the techniques described above to control fluid flow through the vibration isolator 502. For example, the controller 504 can generate a command signal to oscillate the piston assembly or piston assemblies within the vibration isolation system in a manner that minimizes the response of the vibration feedback sensors. The vibration isolation system's piston assembly (or piston assemblies) dynamically displaces the tuning fluid between upper and lower chambers of the vibration isolator and provides controllable vibration isolator tuning fluid oscillation. Good vibration isolation can be achieved by overcoming fluid damping losses within the vibration isolator and by adjusting vibration isolator frequency response characteristics. Implementing the techniques described here can minimize the transmission of vibration from the rotor to the fuselage. Optimal vibration isolation can be achieved for a wide range of helicopter rotor RPM.

Figure 6:
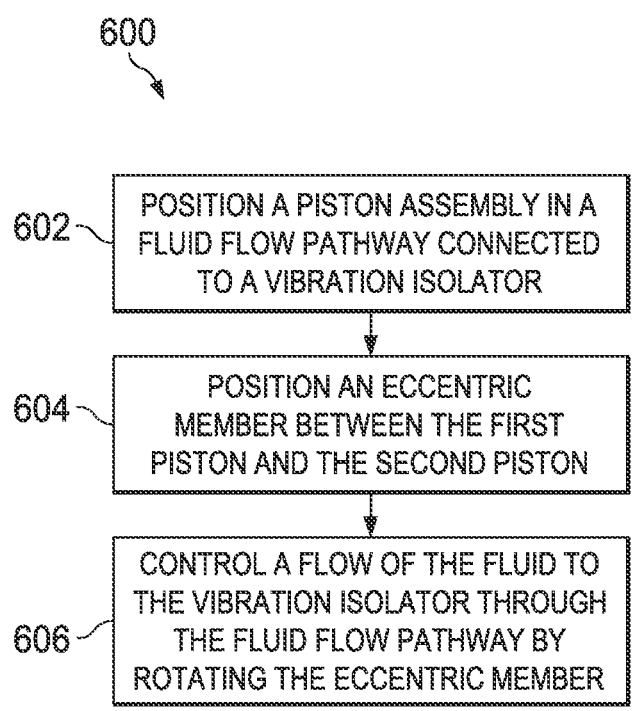
FIG. 6 is a flowchart of an example process of controlling a vibration isolator.

FIG. 6 is a flowchart of an example process 600 of controlling a vibration isolator. At 602, a piston assembly is positioned in a fluid flow pathway connected to the vibration isolator. The piston assembly includes a first piston and a second piston configured to displace fluid in opposite directions through the fluid flow pathway to the vibration isolator. At 604, an eccentric member is positioned between the first piston and the second piston. At 606, a flow of the fluid to the vibration isolator through the fluid flow pathway is controlled by controlling a displacement of the first piston and the second piston by at least partially rotating the eccentric member.

A number of implementations have been described. Nevertheless, it will be understood that various modifications may be made without departing from the spirit and scope of the disclosure.

The invention claimed is:

1. A vibration isolation system comprising:
    a vibration isolator configured to have a fluid flow through a tuning port;
    a fluid pumping system connected to the vibration isolator, the fluid pumping system comprising:
        a fluid flow pathway configured to flow the fluid to the vibration isolator;
        a piston assembly positioned in the fluid flow pathway, the piston assembly comprising a first piston and a second piston configured to displace the fluid in opposite directions through the fluid flow pathway; and
    a fluid flow augmentation system comprising a first motor connected to an eccentric member positioned between the first piston and the second piston, the first motor configured to at least partially rotate the eccentric member in a first direction, a second motor connected to the eccentric member, the second motor configured to at least partially rotate the eccentric member in a second direction opposite the first direction, wherein the fluid flow augmentation system is configured to control a flow of the fluid to the vibration isolator through the fluid flow pathway by controlling a displacement of the first piston and the second piston through at least a partial rotation of the eccentric member using the first motor or the second motor.

2. The system of claim 1, wherein the fluid flow augmentation system further comprises a first clutch connected to the first motor and the eccentric member and a second clutch connected to the second motor and the eccentric member, the first clutch configured to transmit at least the partial rotation of the first motor in the first direction to the eccentric member, and the second clutch configured to transmit at least the partial rotation of the second motor in the second direction to the eccentric member.

3. The system of claim 2, further comprising a controller connected to the first clutch, the first motor, the second clutch, and the second motor, the controller configured to control the first clutch, the first motor, the second clutch and the second motor to control a transmission of rotation of the first motor and the second motor to the eccentric member.

4. The system of claim 3, further comprising at least one vibration sensor connected to the vibration isolator and the controller, the controller configured to control the first clutch, the first motor, the second clutch and the second motor based, in part, on vibration sensed by the vibration sensor.

5. A vibration isolation system comprising:
 a vibration isolator configured to have a fluid flow through a tuning port;
 a fluid pumping system connected to the vibration isolator, the fluid pumping system comprising:
  a fluid flow pathway connected in parallel with the tuning port of the vibration isolator and configured to flow the fluid to the tuning port of the vibration isolator;
  a piston assembly positioned in the fluid flow pathway, the piston assembly comprising a first piston and a second piston configured to displace the fluid in opposite directions through the fluid flow pathway;
 a fluid flow augmentation system comprising:
  an eccentric member positioned between the first piston and the second piston, wherein the fluid flow augmentation system is configured to control a flow of the fluid to the tuning port of the vibration isolator through the fluid flow pathway by controlling a displacement of the first piston and the second piston through at least a partial rotation of the eccentric member;
  a fluid bypass pathway connected in parallel with both the fluid flow pathway and the tuning port of the vibration isolator, the fluid bypass pathway to flow at least a portion of the fluid;
  a fluid flow regulation valve connecting the fluid bypass pathway and tuning port of the vibration isolator; and
  a controller connected to the fluid flow regulator valve that controls a position of the fluid flow regulation valve to regulate a quantity of fluid flowed to the fluid bypass pathway and a quantity of fluid flowed to the tuning port of the vibration isolator, wherein the position of the fluid flow regulation valve comprises a first position in which the tuning port is closed and the fluid bypass passageway is open, and a second position in which the tuning port is open and the fluid bypass passageway is closed.

6. The system of claim 5, further comprising at least one vibration sensor connected to the vibration isolator and the controller, the controller configured to control the fluid flow regulation valve based, in part, on vibration sensed by the vibration sensor.

7. A vibration isolation system comprising:
 a vibration isolator configured to have a fluid flow through a tuning port;
 a fluid pumping system connected to the vibration isolator, the fluid pumping system comprising:
  a first fluid flow pathway configured to flow the fluid to the vibration isolator;
  a first piston assembly positioned in the fluid flow pathway, the first piston assembly comprising a first piston and a second piston configured to displace the fluid in opposite directions through the first fluid flow pathway;
  a second fluid flow pathway configured to flow the fluid to the vibration isolator, the second fluid flow pathway connected to the vibration isolator and the first fluid flow pathway;
  a second piston assembly positioned in the second fluid flow pathway, the second piston assembly comprising a third piston and a fourth piston configured to displace the fluid in opposite directions through the second fluid flow pathway; and
 a fluid flow augmentation system comprising a first eccentric member positioned between the first piston and the second piston, a second eccentric member positioned between the third piston and the fourth piston, wherein the fluid flow augmentation system is configured to control a flow of the fluid to the vibration isolator through the first fluid flow pathway and the second fluid pathway by controlling a displacement of the first piston and the second piston through at least a partial rotation of the first eccentric member and a displacement of the third piston and the fourth piston through at least a partial rotation of the second eccentric member.

8. The system of claim 7, wherein the fluid flow augmentation system comprises a motor connected to the second eccentric member, the motor configured to control the rotation of the second eccentric member.

9. The system of claim 8, further comprising a controller connected to the first motor and the second motor, the controller configured to control a rotational phase relationship between the first eccentric member and the second eccentric member.

10. The system of claim 9, further comprising at least one vibration sensor connected to the vibration isolator and the controller, the controller configured to control the rotational phase relationship between the first eccentric member and the second eccentric member based, in part, on vibration sensed by the vibration sensor.

11. A method of controlling a vibration isolator, the method comprising:
 positioning a piston assembly in a fluid flow pathway connected to the vibration isolator, the piston assembly comprising a first piston and a second piston configured to displace fluid in opposite directions through the fluid flow pathway to the vibration isolator;
 positioning an eccentric member between the first piston and the second piston; and
 controlling a flow of the fluid to the vibration isolator through the fluid flow pathway by controlling a displacement of the first piston and the second piston by at least partially rotating the eccentric member in opposite directions using a first motor and a second motor connected to the eccentric member, the first motor and the second motor configured to rotate the eccentric member in opposite directions.

12. The method of claim 11, wherein at least partially rotating the eccentric member in opposite directions using the first motor and the second motor comprises:
 connecting a first clutch to the first motor and the eccentric member;
 connecting a second clutch to the second motor and the eccentric member; and
 controlling a transmission of a rotation of the first motor and a transmission of a rotation of the second motor to the eccentric member.

13. The method of claim 11, wherein controlling a flow of the fluid to the vibration isolator through the fluid flow pathway comprises:

receiving, from a vibration sensor, a vibration signal representing a vibration of the vibration isolator; and modifying a rotation of the eccentric member based, in part, on the received vibration signal to control the displacement of the first piston and the second piston.

14. A method of controlling a vibration isolator, the method comprising:

positioning a piston assembly in a fluid flow pathway connected in parallel to a tuning port of the vibration isolator, the piston assembly comprising a first piston and a second piston configured to displace fluid in opposite directions through the fluid flow pathway to the tuning port of the vibration isolator;

positioning an eccentric member between the first piston and the second piston;

controlling a flow of the fluid to the tuning port of the vibration isolator through the fluid flow pathway by controlling a displacement of the first piston and the second piston by at least partially rotating the eccentric member;

positioning a fluid bypass pathway in parallel with both the fluid flow pathway and the tuning port of the vibration isolator, the fluid bypass pathway to flow at least a portion of the fluid;

connecting a fluid flow regulation valve to the fluid bypass pathway and the tuning port of the vibration isolator; and controlling a position of the fluid flow regulation valve to regulate a quantity of fluid flowed to the fluid bypass pathway and a quantity of fluid flowed to the tuning port of the vibration isolator, wherein the position of the fluid flow regulation valve comprises a first position in which the tuning port is closed and the fluid bypass passageway is open, and a second position in which the tuning port is open and the fluid bypass passageway is closed.

15. The method of claim 14, wherein controlling a flow of the fluid to the vibration isolator through the fluid flow pathway comprises:

receiving, from a vibration sensor, a vibration signal representing a vibration of the vibration isolator; and controlling the fluid regulation valve based, in part, on the received vibration signal.

16. A method of controlling a vibration isolator, the method comprising:

positioning a first piston assembly in a first fluid flow pathway connected to the vibration isolator, the first piston assembly comprising a first piston and a second piston configured to displace fluid in opposite directions through the fluid flow pathway to the vibration isolator;

positioning a first eccentric member between the first piston and the second piston; and connecting a second fluid flow pathway to the vibration isolator and the first fluid flow pathway, the second fluid flow pathway configured to flow the fluid to the vibration isolator;

positioning a second piston assembly in the second fluid flow pathway, the second piston assembly comprising a third piston and a fourth piston configured to displace the fluid in opposite directions through the second fluid flow pathway;

positioning a second eccentric member between the third piston and the fourth piston; and controlling a flow of the fluid to the vibration isolator through the first fluid flow pathway and the second fluid flow pathway by controlling a displacement of the first piston and the second piston by at least partially rotating the first eccentric member and controlling a displacement of the third piston and the fourth piston through at least a partial rotation of the second eccentric member.

17. The method of claim 16, wherein controlling a flow of the fluid to the vibration isolator through the fluid flow pathway comprises:

receiving, from a vibration sensor, a vibration signal representing a vibration of the vibration isolator; and modifying a rotation of the first eccentric member or the second eccentric member based, in part, on the received vibration signal.

* * * * *